(12) United States Patent
Lu et al.

(10) Patent No.: US 11,423,688 B2
(45) Date of Patent: Aug. 23, 2022

(54) FINGERPRINT SENSING MODULE

(71) Applicant: NOVATEK Microelectronics Corp., Hsin-Chu (TW)

(72) Inventors: Yuan-Heng Lu, Hsinchu (TW); Tsung-Chan Lee, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/133,658

(22) Filed: Dec. 24, 2020

(65) Prior Publication Data

US 2021/0216742 A1 Jul. 15, 2021

Related U.S. Application Data

(60) Provisional application No. 62/960,648, filed on Jan. 13, 2020.

(30) Foreign Application Priority Data

Oct. 28, 2020 (TW) .................................. 109214168

(51) Int. Cl.
*G06V 40/13* (2022.01)
*G02F 1/1333* (2006.01)

(52) U.S. Cl.
CPC ...... *G06V 40/1318* (2022.01); *G02F 1/13338* (2013.01)

(58) Field of Classification Search
CPC ........ G02B 5/208; G02B 5/201; G02B 27/58; G02B 27/30; G02B 6/005; G06K 9/0004; G06K 9/00013; G06K 2009/0006; G06K 9/00046; G06K 9/0012; G02F 1/13338; G02F 1/1333; G02F 1/133512; G06V 40/1318

See application file for complete search history.

(56) References Cited

U.S. PATENT DOCUMENTS

| | | | |
|---|---|---|---|
| 2010/0183200 A1* | 7/2010 | Wu .................... | G06K 9/00046 382/127 |
| 2013/0120760 A1* | 5/2013 | Raguin ................ | G06K 9/0004 356/612 |
| 2015/0078636 A1* | 3/2015 | Carver ................. | G06K 9/0004 382/124 |
| 2016/0224816 A1* | 8/2016 | Smith .................... | G02B 27/58 |
| 2018/0260602 A1* | 9/2018 | He ........................ | A61B 5/1495 |
| 2019/0179488 A1* | 6/2019 | Klenkler ............... | G06F 3/0412 |
| 2020/0034597 A1* | 1/2020 | He .................... | G02F 1/133308 |

* cited by examiner

*Primary Examiner* — Abhishek Sarma
(74) *Attorney, Agent, or Firm* — Winston Hsu

(57) ABSTRACT

A fingerprint sensing module is used for a liquid crystal display (LCD) panel having a sensing area. The fingerprint sensing module includes a light source and a shielding frame. The light source is configured to provide light emission for fingerprint sensing performed on the sensing area, wherein the sensing area is at a first side of the light source. The shielding frame is disposed on a light emission path from the light source toward the first side.

10 Claims, 5 Drawing Sheets

FINGERPRINT SENSING MODULE

CROSS REFERENCE TO RELATED APPLICATIONS

This application claims the benefit of U.S. Provisional Application No. 62/960,648, filed on Jan. 13, 2020, the contents of which are incorporated herein by reference.

BACKGROUND OF THE INVENTION

1. Field of the Invention

The present invention relates to a fingerprint sensing module, and more particularly, to a fingerprint sensing module for a liquid crystal display (LCD) panel.

2. Description of the Prior Art

Fingerprint recognition technology is widely applied in a variety of electronic products such as a mobile phone, laptop, tablet, personal digital assistant (PDA), and portable electronics, for realizing identity recognition. The fingerprint sensing allows a user to perform identity recognition conveniently, where the user may only need to put his/her finger on a fingerprint sensing pad or area to login the electronic device instead of entering long and tedious username and password.

Optical fingerprint sensing has become the mainstream of the currently available fingerprint sensing technologies. The optical in-display fingerprint recognition system is mainly applied to an organic light-emitting diode (OLED) display panel. Please refer to FIG. 1, which is a schematic diagram of the structure of an OLED display panel 10. Light emission of the OLED display panel 10 is sourced from the OLEDs inside the pixels, and the OLED display panel 10 belongs to a self-luminance structure and has a high-uniformity light field. In other words, as for the fingerprint sensing performed on every position of the panel, the sensing lens below the panel can receive fingerprint sensing images having high similarity.

Please refer to FIG. 2, which is a schematic diagram of the structure of a liquid crystal display (LCD) panel 20. Different from the OLED display panel 10, the LCD panel 20 has a backlight structure and needs to use an external light source for providing light emission. Taking FIG. 2 as an example, there are 4 light sources disposed around the panel for providing light emission for fingerprint image sensing. However, these external light sources have a problem of light field directivity, causing an inconsistency on the fingerprint image of the same finger at different degrees or different distances, resulting in a higher error rate on fingerprint recognition.

Thus, there is a need to provide a structure of a fingerprint sensing module to eliminate the problem of light field directivity, in order to improve the image quality of fingerprint sensing.

SUMMARY OF THE INVENTION

It is therefore an objective of the present invention to provide a structure of the fingerprint sensing module for a liquid crystal display (LCD) panel capable of eliminating the light field directivity of fingerprint sensing, in order to solve the above problems.

An embodiment of the present invention discloses a fingerprint sensing module for an LCD panel having a sensing area. The fingerprint sensing module comprises a light source and a shielding frame. The light source is configured to provide light emission for fingerprint sensing performed on the sensing area, wherein the sensing area is at a first side of the light source. The shielding frame is disposed on a light emission path from the light source toward the first side.

Another embodiment of the present invention discloses a fingerprint sensing module for an LCD panel having a sensing area. The fingerprint sensing module comprises a light source and a light guide structure. The light source is configured to provide light emission for fingerprint sensing performed on the sensing area, wherein the sensing area is at a first side of the light source. The light guide structure, disposed on an emitting surface of the light source, is configured to orient light emitted by the light source toward a direction opposite to the first side.

Another embodiment of the present invention discloses a fingerprint sensing module for an LCD panel having a sensing area. The fingerprint sensing module comprises a light source and a lens. The light source is configured to provide light emission for fingerprint sensing performed on the sensing area, wherein the sensing area is at a first side of the light source. The lens, disposed on an emitting surface of the light source, is configured to concentrate light emitted by the light source to a direction not at the first side.

These and other objectives of the present invention will no doubt become obvious to those of ordinary skill in the art after reading the following detailed description of the preferred embodiment that is illustrated in the various figures and drawings.

DETAILED DESCRIPTION

The present invention provides the structure of a fingerprint sensing module applicable to a liquid crystal display (LCD) panel. As mentioned above, the LCD panel has a backlight panel structure that utilizes visible backlight source(s) to generate light emission for image display. In general, the optical fingerprint sensing for an LCD panel is implemented by disposing additional light sources around the sensing area. In order to prevent the visual effect from being influenced, the infrared light may be used to perform fingerprint sensing. In other words, the infrared light sources disposed around the sensing area is only used for fingerprint sensing, not for providing light emission for display of the LCD panel.

Figure 1:
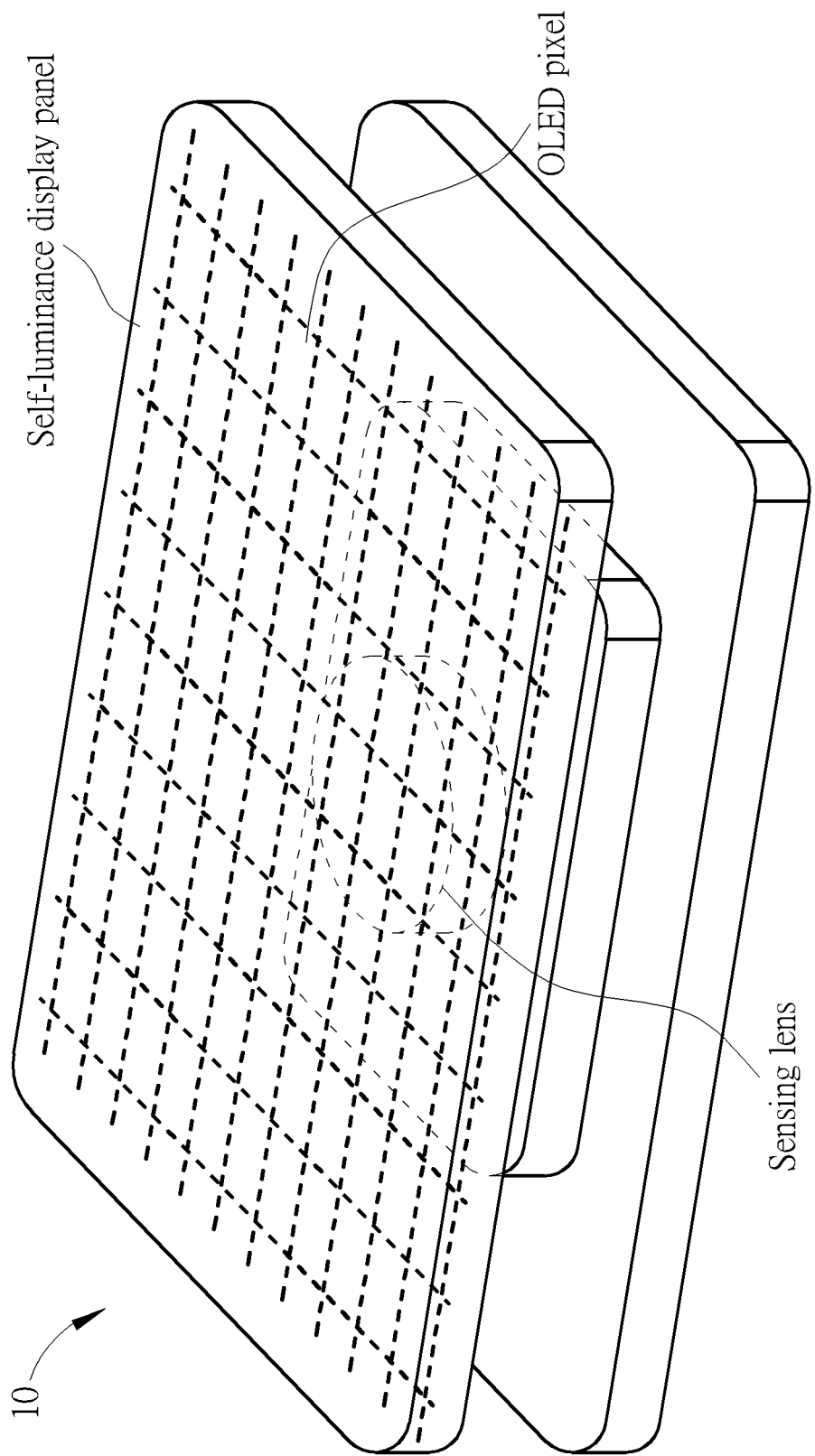
FIG. 1 is a schematic diagram of the structure of an OLED display panel.
Figure 2:
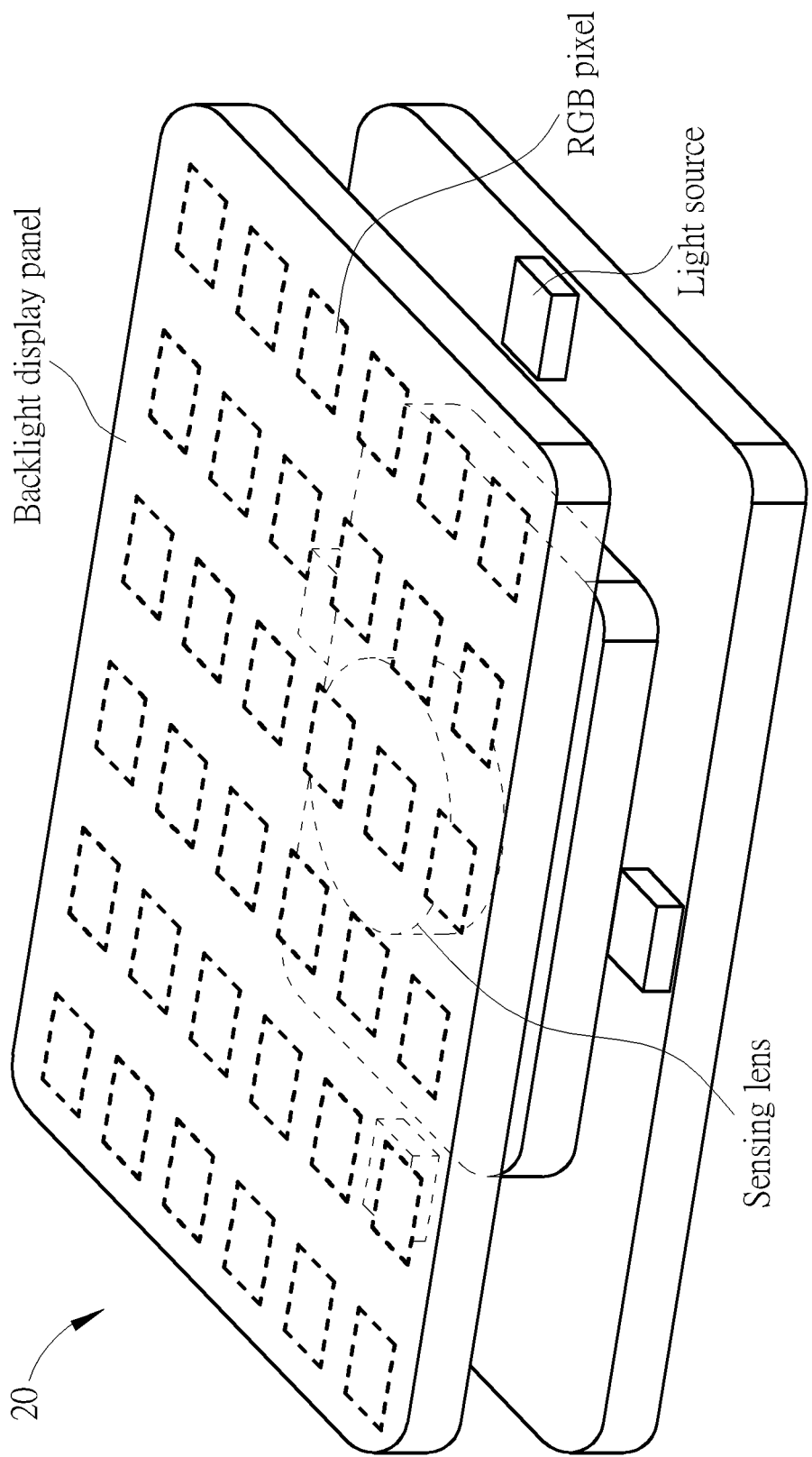
FIG. 2 is a schematic diagram of the structure of an LCD panel.
Figure 3:
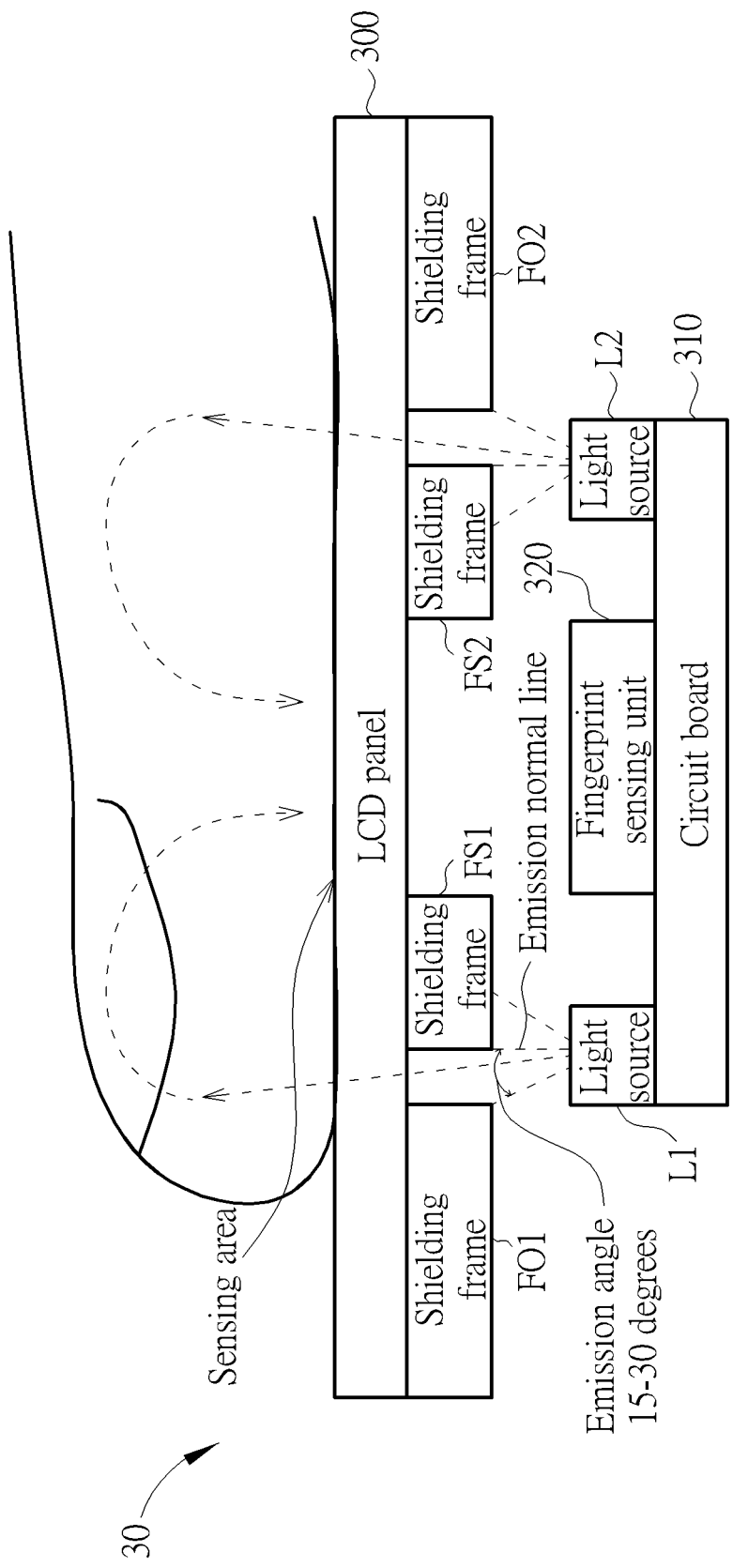
FIG. 3 is a schematic diagram of a fingerprint sensing module according to an embodiment of the present invention.

Please refer to FIG. 3, which is a schematic diagram of a fingerprint sensing module 30 according to an embodiment of the present invention. As shown in FIG. 3, the fingerprint sensing module 30 includes light sources L1 and L2, shielding frames FS1, FS2, FO1 and FO2, a circuit board 310 and a fingerprint sensing unit 320. The fingerprint sensing module 30 may further include an LCD panel or not, where an LCD panel 300 is shown in FIG. 3 to facilitate the illustrations. In detail, the LCD panel 300 includes a sensing area for receiving fingerprint image signals. The circuit board 310, which may be a printed circuit board (PCB), flexible printed circuit (FPC) board, or any other type of substrate capable of carrying the circuitry, is disposed below the LCD panel 300. The light sources L1, L2 and the fingerprint sensing unit 320 are disposed on the circuit board 310. Each of the light sources L1 and L2 may be composed of one or more infrared light light-emitting diodes (IR LEDs). In general, the LED light sources have a design of light emission angle. For example, when the light source L1 or L2 is disposed on the circuit board 310, it is always configured to have an upward light emission direction and a predefined light emission angle, e.g., 30 degrees or 60 degrees; that is, the light is emitted toward the normal direction relative to the surface of the circuit board 310 (i.e., the direction perpendicular to the surface of the circuit board 310), and appears to have an upward conical emission path corresponding to the light emission angle. The fingerprint sensing unit 320 may include multiple fingerprint sensing pixels for receiving light to determine the variations of ridges and valleys of the fingerprint. In the fingerprint sensing module 30, the light sources L1 and L2 provide lights to illuminate the finger, so that the image received by the fingerprint sensing pixel changes in color depth. For example, the ridge position is attached to the panel, and there is no air medium between the ridge and the panel, which may present a brighter image. There is a narrow gap between the valley position and the panel, which causes the energy of light to attenuate and displays a darker image.

The shielding frames FS1, FS2, FO1 and FO2 may be used to block lights, and form openings to pass light in a specific direction to achieve the purpose of fingerprint sensing. Among these shielding frames, the shielding frames FS1 and FS2 are used to block the light emitted from the light sources L1 and L2 to the inner side, and the shielding frames FO1 and FO2 are used to block the light emitted from the light sources L1 and L2 to the outer side. As mentioned above, the light source L1 or L2 usually has an upward light emission direction, and the emitted light is reflected to the sensing area within the emission angle. When there are no shielding frames FS1 and FS2, the light reaching the finger may be reflected, scattered or diffused back to the fingerprint sensing unit 320 to be received. When a directional light illuminates the finger, the light reflected by the finger will have different intensities due to the distance between the light source and the finger. Such a variation of intensities of the reflected light will interfere with the fingerprint recognition result. More specifically, the light emitted inwards from the light sources L1 and L2 may reach the sensing area on the inner side, and reach the fingerprint sensing unit 320 through reflection of the finger on the sensing area, such that the fingerprint image received by the fingerprint sensing unit 320 includes brightness variations due to different intensities of the reflected light. Since the difference of image brightness between ridges and valleys is usually quite small, the images are susceptible to the variation of reflected light brightness, resulting in degradation in the quality of the fingerprint image.

Therefore, in the present invention, the fingerprint sensing module 30 includes the shielding frames FS1 and FS2, which are arranged on the light emission path of the light source L1 or L2 reflected inwardly to the sensing area, to shield the directional light inwardly emitted from the light source L1 or L2. This prevents the light from the light source L1 or L2 toward the inner side from being directly reflected by the finger to reach the fingerprint sensing unit 320, causing the fingerprint image sensed by the fingerprint sensing unit 320 to be interfered with by variations of the reflected light.

When the directional reflected light is shielded by the shielding frames FS1 and FS2, the light received by the fingerprint sensing unit 320 only includes the light scattered or diffused through the inside of the finger, forming a non-directional and uniform light field and producing uniform fingerprint imaging. In this embodiment, since the fingerprint sensing module 30 applies infrared light as the light sources L1 and L2 for fingerprint sensing, the infrared light may be incident into the subcutaneous tissue inside the skin, so as to be diffused uniformly through the internal structure of the skin, and then diverge to the fingerprint sensing unit 320 to be received. In this way, the images at any position of the finger can faithfully present the information of ridges and valleys, without being affected by the directivity of the light, thereby improving the accuracy of fingerprint recognition.

In an embodiment, the positions of the shielding frames FS1 and FS2 located inner to the light sources L1 and L2 may be designed to let one boundary of the shielding frames FS1 and FS2 to be aligned with the emission normal line of the light sources L1 and L2, respectively, so that the shielding frames FS1 and FS2 may completely block the light emission path at the inner side of the emission normal line. The other side of the shielding frames FS1 and FS2 may correspond to the boundary of the fingerprint sensing unit 320, so that the light diffused from the inside of the finger can reach the fingerprint sensing unit 320 smoothly. However, those skilled in the art should understand that as long as the shielding frame may completely or partially block the directional light emitted from the light source L1 or L2 and then reflected by the finger surface to enter the fingerprint sensing unit 320. The related deployment method should not be served to limit the scope of the present invention.

In addition, the shielding frames FS1, FS2, FO1 and FO2 are used to form openings. These openings are located at the outer direction of the emission normal line, and the size of the openings may correspond to the emission angle between about 15 degrees to 30 degrees. Those skilled in the art should understand that the size and position of the openings may be disposed according to actual requirements. For example, according to the emission angle design of the light sources L1 and L2, the openings may be disposed at a specific position and angle outside the emission normal line. For example, if the emission angle of the light sources L1 and L2 is 60 degrees and the light emission direction is directly to the normal position, the emission angle covers the range between 30 degrees inside the normal line and 30 degrees outside the normal line. At this moment, the opening may be correspondingly disposed at the position between the normal line and outward 30 degrees.

Please note that the present invention aims at providing the structure of a fingerprint sensing module capable of eliminating the directivity of light field. Those skilled in the art may make modifications and alterations accordingly. For example, in the above embodiments, two light sources L1 and L2 are applied and respectively arranged on both sides of the sensing area. However, in another embodiment, suitable light source(s) may be disposed according to actual requirements. For example, as for a square sensing area, one light source may be disposed in the middle of each of the four sides of the sensing area. Alternatively, each side may be deployed with two light sources to improve the intensity and uniformity of the light field. In addition, in the above embodiments, the inner shielding frames FS1 and FS2 are used to block the directional light, and the outer shielding frames FO1 and FO2 are provided at positions outer than the emission angle to block the light scattered outwards. In an embodiment, since the infrared light does not affect the image display, the outer shielding frames FO1 and FO2 may be omitted. As long as the inner shielding frames FS1 and FS2 are provided, the effect of reducing the overall light field directivity may be achieved. In addition, additional shielding frames may also be disposed between the light sources L1 and L2 and the fingerprint sensing unit 320 to avoid or reduce unnecessary light received by the fingerprint sensing unit 320. In the present invention, the shielding frames may be realized with non-transparent materials or any materials that may shield the light emitted by the light sources.

Figure 4:
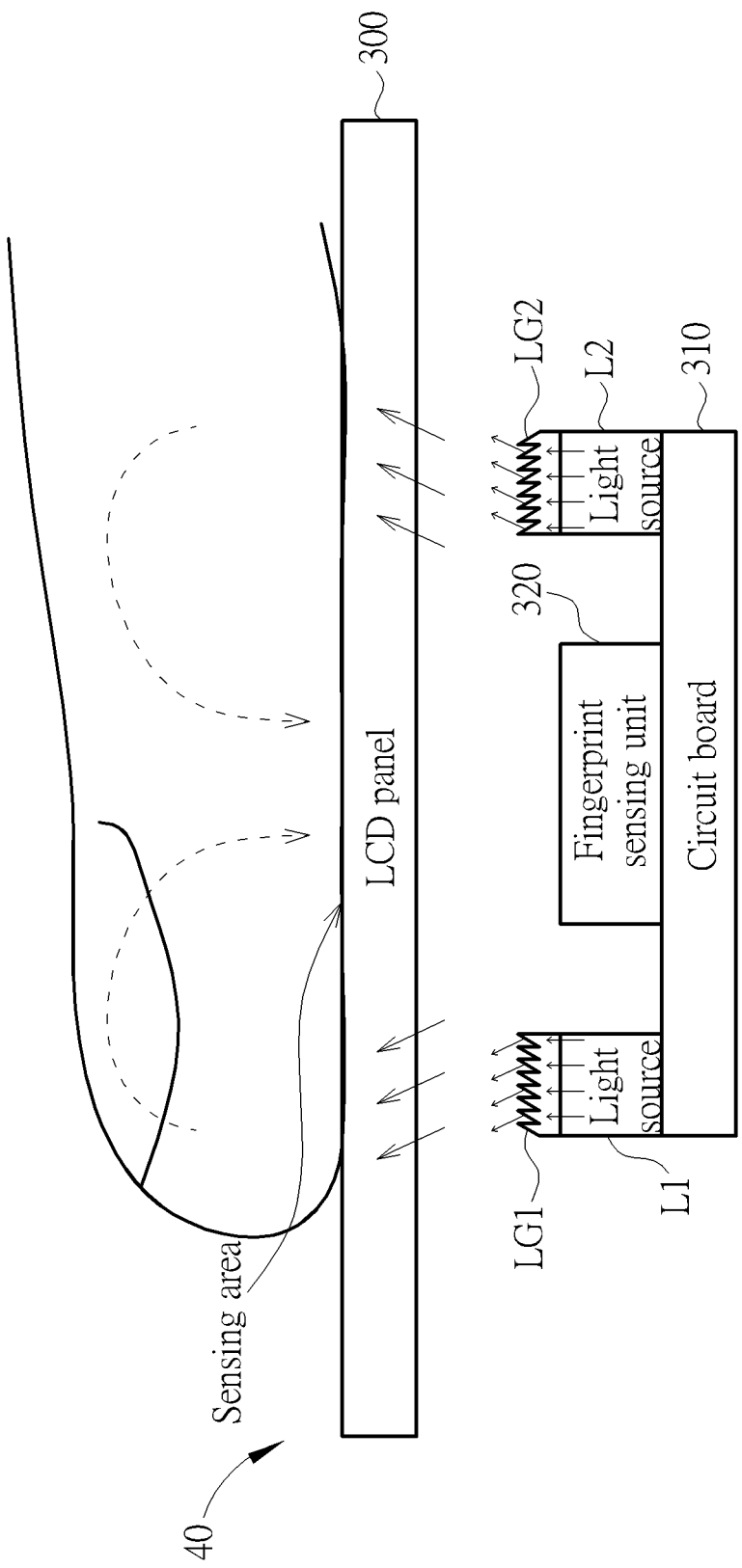
FIG. 4 is a schematic diagram of another fingerprint sensing module according to an embodiment of the present invention.

Since the present invention arms at reducing the directivity of light field, in some embodiments, other methods may also be applied to reduce the directivity of light field, such as changing the direction of the light to prevent the light from being directly reflected by the finger surface to enter the sensing pixels of the fingerprint sensing unit. Please refer to FIG. 4, which is a schematic diagram of another fingerprint sensing module 40 according to an embodiment of the present invention. As shown in FIG. 4, the structure of the fingerprint sensing module 40 is similar to the structure of the fingerprint sensing module 30, so the elements having similar functions are denoted by the same symbols. The main difference between the fingerprint sensing module 40 and the fingerprint sensing module 30 is that the fingerprint sensing module 40 does not use a shielding frame, but is disposed with light guide structures LG1 and LG2 on the emitting surface of the light sources L1 and L2, respectively. The light guide structures LG1 and LG2 may respectively orient the light emitted by the light sources L1 and L2 to the outward direction, so as to reduce or prevent the light from entering the sensing area inside and reaching the fingerprint sensing unit 320 through reflection of the finger, thereby reducing the light field directivity. Similarly, the outward light emission may reach the fingerprint sensing unit 320 through scattering or diffusion inside the finger to form a non-directional and uniform light field and produce uniform fingerprint imaging.

The light guide structures LG1 and LG2 may be realized in any feasible way, e.g., a microstructure with the function of changing the direction of light may be used. In an embodiment, the light guide structures LG1 and LG2 may include a prism having a saw-toothed surface, as shown in FIG. 4. The light guide structures LG1 and LG2 may be attached to the emitting surface of the light sources L1 and L2, respectively, so that the light emitted from the surface of the light sources L1 and L2 may be guided outwards to incident into the finger. In another embodiment, the light guide structures may also be arranged on other light passing paths, as long as the arrangement of the light guide structures may reduce the directivity of light field.

Figure 5:
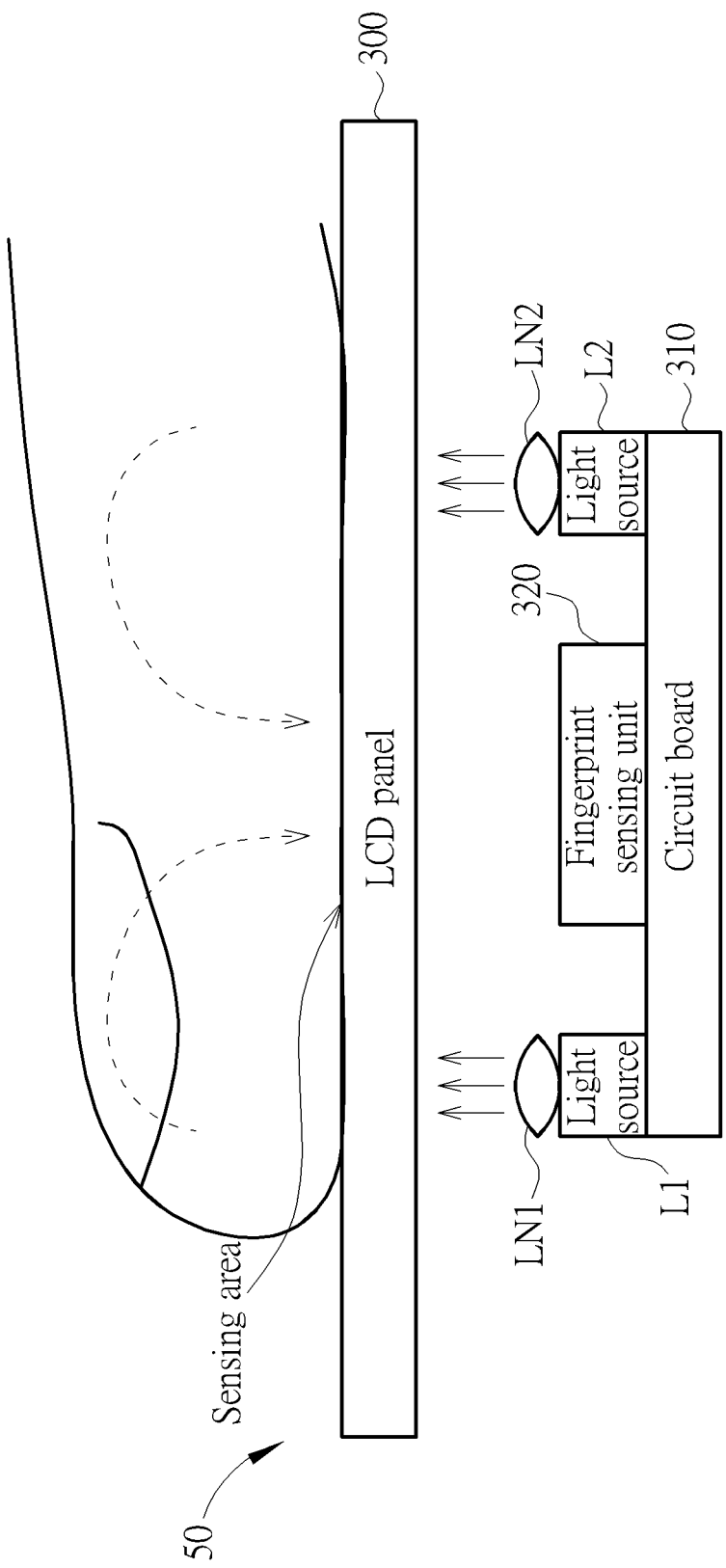
FIG. 5 is a schematic diagram of a further fingerprint sensing module according to an embodiment of the present invention.

Please refer to FIG. 5, which is a schematic diagram of a further fingerprint sensing module 50 according to an embodiment of the present invention. As shown in FIG. 5, the structure of the fingerprint sensing module 50 is similar to the structure of the fingerprint sensing module 40, so elements having similar functions are denoted by the same symbols. The main difference between the fingerprint sensing module 50 and the fingerprint sensing module 40 is that the fingerprint sensing module 50 uses lenses LN1 and LN2 to concentrate light instead of the light guide structures LG1 and LG2. The lenses LN1 and LN2 may be convex lenses or other types of condensing lenses for concentrating the light emitted by the light sources L1 and L2 to the upward direction (or may adjust the light outwards). The light incident upward into the finger may not be directly reflected to the fingerprint sensing unit 320, which reduces the reflected light received by the fingerprint sensing unit 320, thereby reducing the directivity of light field. In this way, the light may reach the fingerprint sensing unit 320 through scattering or diffusion inside the finger to form a non-directional and uniform light field and produce uniform fingerprint imaging.

As shown in FIG. 5, the lenses LN1 and LN2 may be attached to the emitting surface of the light sources L1 and L2, respectively, to concentrate the light emitted from the surface of the light sources L1 and L2. In another embodiment, the lenses may also be arranged on other light passing paths, as long as the arrangement of the lenses may reduce the directivity of light field.

In an embodiment, the light guide structures may be deployed with lenses to further control the light to enter the sensing area and the finger in a better way. Alternatively, a shielding frame may also be added at an appropriate position under the arrangement of the light guide structures or the lenses. The above implementations all belong to the scope of the present invention.

To sum up, the present invention provides the structure of a fingerprint sensing module applicable to an LCD panel, for improving the uniformity of the light field of fingerprint sensing. Through the embodiments of the present invention, the reflected directional light may be eliminated; that is, the directional light emitted from the light source to reach the finger and then reflected by the finger surface to enter the fingerprint sensing unit may be eliminated. In an embodiment, a shielding frame may be arranged on the light emission path inside the normal line of the light source reflected to the sensing area, to block the directional light that may be reflected by the finger surface to reach the fingerprint sensing unit. In other embodiments, the light guide structure and/or the lens may also be used to change the direction of light to reduce the inward reflected light, thereby reducing the reflected light received by the fingerprint sensing unit. As a result, the influences on the fingerprint images caused by the directivity of light may be prevented or alleviated, so as to improve the image quality of fingerprint sensing, thereby improving the accuracy of fingerprint recognition.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A fingerprint sensing module, for a liquid crystal display (LCD) panel, the LCD panel having a sensing area, the fingerprint sensing module comprising:
   a fingerprint sensing unit;
   a light source, configured to provide light emission for fingerprint sensing performed on the fingerprint sensing unit, wherein the sensing area is at a first side of the light source; and
   a shielding frame, disposed on a light emission path from the light source toward the first side, to entirely block direct light from the light source incident to the sensing area so that light received by the fingerprint sensing unit includes only the light scattered through an inside of a finger without any light directly reflected from the finger.

2. The fingerprint sensing module of claim 1, wherein a boundary of the shielding frame is aligned with an emission normal line of the light source.

3. The fingerprint sensing module of claim 2, wherein the shielding frame is configured to entirely block the light emission path at a direction of the first side of the emission normal line.

4. The fingerprint sensing module of claim 1, wherein the shielding frame is used to form an opening, the opening is located in a direction opposite to the first side of the emission normal line, and a size of the opening corresponds to an emission angle between 15 degrees and 30 degrees.

5. The fingerprint sensing module of claim 1, wherein the light source is an infrared light source, and the light source is not used to provide light emission for display of the LCD panel.

6. A fingerprint sensing module, for a liquid crystal display (LCD) panel, the LCD panel having a sensing area, the fingerprint sensing module comprising:
a fingerprint sensing unit;
a light source, configured to provide light emission for fingerprint sensing performed on the fingerprint sensing unit, wherein the sensing area is at a first side of the light source; and
a light guide structure, disposed on an emitting surface of the light source, the light guide structure being configured to orient light emitted by the light source toward a direction opposite to the first side at which the sensing area is located so that light received by the fingerprint sensing unit includes only the light scattered through an inside of a finger without any light directly reflected from the finger.

7. The fingerprint sensing module of claim 6, wherein the light guide structure comprises a saw-toothed prism.

8. The fingerprint sensing module of claim 6, wherein the light guide structure is attached to the emitting surface of the light source.

9. A fingerprint sensing module, for a liquid crystal display (LCD) panel, the LCD panel having a sensing area, the fingerprint sensing module comprising:
a fingerprint sensing unit;
a light source, configured to provide light emission for fingerprint sensing performed on the fingerprint sensing unit, wherein the sensing area is at a first side of the light source; and
a lens, disposed on an emitting surface of the light source, the lens being configured to concentrate light emitted by the light source to a direction not at the first side at which the sensing area is located so that light received by the fingerprint sensing unit includes only the light scattered through an inside of a finger without any light directly reflected from the finger.

10. The fingerprint sensing module of claim 9, wherein the lens is attached to the emitting surface of the light source.

* * * * *